Aug. 26, 1958 F. KESSELRING 2,849,659
DIRECT-CURRENT AND ALTERNATING-CURRENT CIRCUIT INTERRUPTERS
Filed March 24, 1954 10 Sheets-Sheet 1
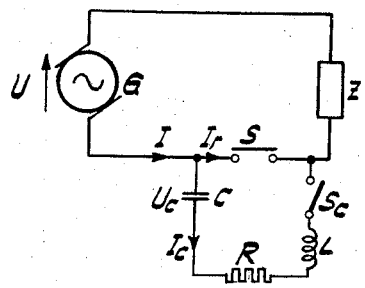
Fig.1
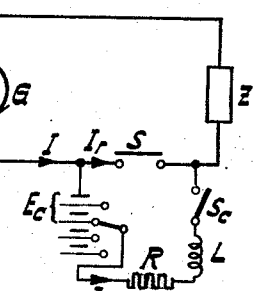
Fig.2
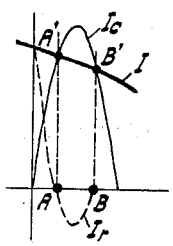
Fig.3
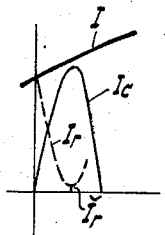
Fig.4
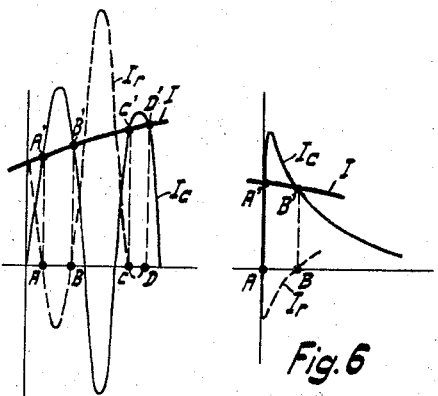
Fig.5
Fig.6
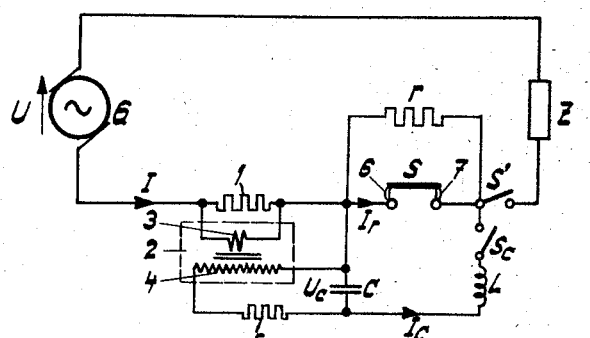
Fig.7

Aug. 26, 1958                F. KESSELRING                 2,849,659
       DIRECT-CURRENT AND ALTERNATING-CURRENT CIRCUIT INTERRUPTERS
Filed March 24, 1954                                  10 Sheets-Sheet 5

United States Patent Office 2,849,659
Patented Aug. 26, 1958

2,849,659

DIRECT-CURRENT AND ALTERNATING-CURRENT CIRCUIT INTERRUPTERS

Fritz Kesselring, Zollikon, Zurich, Switzerland, assignor to Siemens-Schuckertwerke Aktiengesellschaft, Berlin-Siemensstadt, Germany, a corporation of Germany Application March 24, 1954, Serial No. 418,263

Claims priority, application Switzerland March 25, 1953

16 Claims. (Cl. 317—11)

This invention relates to circuit interrupters or breakers and is directed particularly to circuit breakers of high current capacity capable either of automatic operation upon overload or manual operation.

The known power circuit breakers for alternating current operate almost exclusively on the principle of utilizing the natural current extinction occurring at a current zero passage and provide for cooling and deionizing the residual arc. This principle has the advantage that at the current zero passage the magnetic energy of the circuit to be interrupted is likewise zero.

For the interruption of direct current where a zero passage is not available, fundamentally different arc quenching methods have heretofore been employed. Generally preferred have been quenching arrangements of the largest possible arc gradient. In cases where the direct current to be interrupted is constant or varies only slowly, the occurrence of sparking has been suppressed by quenching circuits usually consisting of capacitors, inductance coils and resistors, the capacitors being either in discharged or suitably charged condition at the moment of interruption. Such quenching circuits are particularly suitable for the suppression of sparks in relays, regulators and the like devices where the interrupting conditions are substantially invariable.

The invention relates to devices for providing favorable interrupting conditions in direct-current and alternating-current breakers, particularly for the control of power currents of the usual line frequencies, and aims at securing an interruption with minimum arcing or no arcing in response to arbitrary and automatic release of the breaker, the arbitrary release being initiated at any time point, for instance manually, while the automatic release comes about as a result of changes in electric conditions, for instance, in response to overload current, reverse current, voltage failure, or other disturbances.

To achieve this object and in accordance with the invention, the interrupting gap is supplied with an impulse current shortly prior to the interruption and particularly also at the beginning of overload and reverse currents; and the impulse current and the instantaneous value of the current to be interrupted are automatically adapted to each other in such a manner that at the interrupting moment the maximum value of the impulse current is at least 80% of the instantaneous value of the current to be interrupted, while the half-value duration of the impulse current is at most about one millisecond. In principle, undamped or damped periodic impulses as well as damped aperiodical impulses may be applied. The impulse energy is preferably taken from a charged capacitor. However, it may also stem from a direct or alternating-current source, particularly a storage battery. It is further possible to supply the impulse energy in form of magnetic energy from a current-traversed inductance.

Still further objects and advantages of the present invention will appear from the more detailed description set forth below, it being understood that this description is given by way of illustration and explanation only, and that various changes therein may be made by those skilled in the art without departing from the scope and spirit of the appended claims.

In the drawings, wherein like reference numerals denote corresponding parts throughout the several views:

Figs. 1 to 6 are explanatory, showing two basic circuit schemes in respective Figs. 1 and 2, and coordinate diagrams of current-time characteristics in respective Figs. 3 to 6;

Fig. 7 is a schematic circuit diagram of an improved embodiment of the basic circuit shown in Fig. 1;

Figure 8:
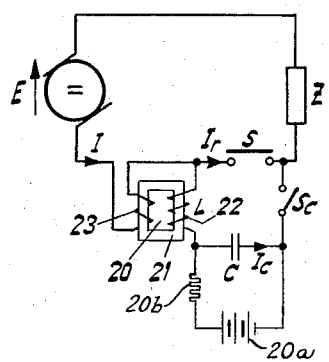
Figs. 8 and 9 show two embodiments of the invention having automatically variable constants in the impulse circuits.

Figs. 1 and 2 illustrate impulse circuits cooperating with respective line-current circuits to be interrupted The load circuit is energized by an alternating voltage U from a generator G (Fig. 1) or the voltage E of a direct current source (Fig. 2). The load current to be interrupted is denoted by I, the load impedance by Z, and the circuit breaker by S. The impulse circuit is connected across the circuit breaker S and comprises in Fig. 1 a capacitor C in series with a resistor R and an inductance coil L. The circuit comprising the source of line-current G, and the load Z traversed by the line-current I is hereinafter called the main circuit. The circuit connected parallel to the breaker S and comprising, for instance, the capacitor C and the reactor L both traversed by the impulse current $I_c$, is hereinafter called the impulse circuit. The voltage across the impulse capacitor C is denoted by $U_c$, and the impulse current is denoted by $I_c$, the voltages and currents being thought of as instantaneous values.

Assume that in Fig. 1 the capacitor C is charged to the voltage $U_c$ in a manner described below, and assume also that the resistance value of resistor R is approximately zero; then, when the switch $S_c$ closes, a periodic discharge will take place, the amplitude of the discharge current having the value $$\hat{I}_c = U_c / \sqrt{\frac{L}{C}}$$

The same conditions occur when the energy is at first accumulated in the inductance L and is then permitted to oscillate through the impulse circuit. If the resistor R has finite resistance values, a damped oscillation will occur, which, in the limit condition, for instance if the inductance value of L is approximately zero, assumes an aperiodic course, the amplitude of the current being then equal to $\hat{I} = U_c / R$.

Fig. 2 shows an example in which the impulse current is supplied from a battery at a voltage $E_c$ corresponding to the respective instantaneous values of the load current I. The wave shape of the impulse current can be adapted by proper selection of the voltage $E_c$ and of the inductance and resistance values of inductance L and resistor R.

Figs. 3 to 6 show time characteristics of different impulse currents in coaction with line current I. Since the half-value duration of the impulse occurring in the invention is smaller than one millisecond and hence is very short in comparison with the half-wave period of an alternating current of usual line frequecy (50 C. P. S. or 60 C. P. S.), the line current varies only slightly during the active period of the impulse so that this variation may be negligible in the following circumstances. By the term "half-value duration" of an impulse we understand the time spacing between the moments when the increasing and declining current passes through the value $\hat{I}_c/2$. With a sinusoidal impulse, the impulse duration is $$\tau = \frac{2}{3} \cdot \frac{T}{2}$$

wherein T denotes the duration of a current cycle.

Figs. 3 and 4 show two respective cases involving a periodic undamped impulse while Figs. 5 and 6 apply to periodic damped and aperiodic impulse characteristics. It will be seen from Fig. 3 that by superimposing the impulse current $I_c$, this current being larger than the instantaneous line current I ($\hat{I}_c > I$), there will be produced two current zero passages A and B of the resultant current $I_r = I - I_c$, the negative current half wave of the resultant current $I_r$ having only a very slight amplitude. If $\hat{I}_c = I$, only one current zero passage will occur. If $I_c$ is smaller than I ($\hat{I}_c < I$), then the resultant current $I_r$, as shown in Fig. 4, reaches only a minimum value $\hat{I}_r$ without occurrence of a zero passage.

For many applications, the use of a damped oscillating impulse is advantageous. The resultant current then assumes a course as represented in Fig. 5. It is essential in this case that the small current waves of the resultant current, opposingly directed to the instantaneous value of the current I, become progressively smaller thus improving the circuit interrupting conditions.

Fig. 6 represents the case in which the capacitor C discharges through a resistor R while the inductance of the circuit is approximately zero. Although theoretically there are two zero passages, the steepness of the current at the first zero passage is so great that generally no favorable interrupting conditions obtain at this time point. It can generally be stated that in each case the second current zero passages B or D in Fig. 5 of a small half-valve of the resultant current produce the most favorable conditions for interruption in breaker S. However, depending upon the type of circuit breaker, the reduction of the resultant current by at least 80% of the instantaneous line current value may suffice for the interruption, for instance, when the breaker S consists of a vacuum switch or when the breaker gap is cooled and deionized in hydrogen.

Fig. 7 serves to explain the interruption of an alternating current, the reference characters in Fig. 7 being identical with those used for corresponding elements in Fig. 1. A shunt resistor 1 traversed by the line current is added. Connected across the shunt resistor 1 is the primary winding 3 of a current transformer whose secondary winding 4 is connected through a series resistor 5 across the impulse capacitor C. When the reactive impedance $$\frac{1}{\omega C}$$

reduced to the primary side of the transformer 2, is made sufficiently large relative to the resistance of shunt resistor 1, then the capacitor voltage $U_c$ is proportional to the respective instantaneous values of the line current I. That is, when the line current is large the capacitor is charged to a correspondingly large voltage, the phase displacement between line current I and capacitor voltage $U_c$ being only slight. If now the line current circuit is to be interrupted, the switch S is at first opened (to the illustrated position). Generally two arcs 6 and 7, at first traversed only by the line current, will now occur. As soon as the contact spacing in breaker S has become sufficiently large, the switch $S_c$ of the impulse circuit is closed. Now an impulse current $I_c$ will flow, and this impulse current will be opposingly directed to the line current I in the breaker S at least in the second half-wave of the line current I. This has the consequence that the resultant current $I_r$ now flowing through the arcs 6 and 7 is of much lesser value or will even pass twice through zero in a short time interval, thus securing the desired safe interruption assuming that the breaker has a properly chosen arc quenching device.

It will therefore be recognized that the superposition of the impulse current upon the line current provides favorable interrupting conditions for the breaker S. It has been mentioned above that these conditions are the more favorable the smaller the current-wave amplitudes of the resultant current $I_r$ opposingly directed to the line current are. This requirement is satisfied by the circuit arrangement according to Fig. 7 because $\hat{U}_c$, and hence the amplitude of the impulse current $\hat{I}_c$, is always proportional to the instantaneous value of the line current. That is, circuit arrangements of this type are characterized by an adaptation of the capacitor voltage $\hat{U}_c$ to the line current I while the values L, C, R, of the impulse circuit are essentially constant.

While the impulse current is flowing, the voltage at the breaker S is essentially equal to the ohmic voltage drop in the impulse circuit. If the impulse circuit, under consideration of the current crowding occurring with high-frequency oscillations, is made as low in losses as possible, the circuit-opening voltage at breaker S can be kept at any desired low value, for instance at 10% of the rated line voltage, a possibility which again promotes advantageous interrupting conditions. This particular advantage is not present to the same degree when the impulse circuit comprises a resistor R.

At the moment when the arcs 6 and 7, conducting the resultant current $I_r$, become extinguished, a series connection of capacitor C and inductance L of the impulse circuit is inserted into the line circuit. At this moment approximately the full impulse energy is accumulated in the inductance L in the form of magnetic energy $L \cdot I_c^2 / 2$, while the capacitor is discharged to a large extent. Now the magnetic energy in L will oscillate through the main circuit while the capacitor can receive at least part of the magnetic energy then present in the main circuit at this moment, whereby overvoltage phenomena are prevented to a considerable extent.

After the decay of these equalizing phenomena, the impedance of the main circuit is increased by the impedance of the series connection of L and C. This impedance has the value $$Z_c = \sqrt{(\omega L)^2 + \left(\frac{1}{\omega C}\right)^2}$$

in which $$\frac{1}{\omega C}$$

is always considerably larger than $\omega L$. If the interruption of a direct-current circuit is involved then the value $$\frac{1}{\omega C}$$

becomes infinite; the line circuit is completely interrupted and hence the residual current $I'$=zero. In alternating-current circuits, however, a residual current will still flow, this residual current being approximately equal to $I' = U\omega C$. If this value is sufficiently small, the residual current can be switched off with the aid of the switch $S_c$. Generally, however, it is preferable to provide a residual-current switch $S'$ which may also be used for closing the main circuit after the breaker S is closed.

It will be understood from the foregoing explanation that by the opening of the breaker S an additional, predominantly capacitive impedance is inserted into the main circuit thereby effecting in direct-current circuits a complete interruption, and in alternating current circuits a reduction of the line current to the extent of its being only a few percent of the rated current value.

Unless a counter voltage is applied, capacitive circuits even with a small current intensity cannot very readily be interrupted because of the large phase angle between the current and the restriking voltage. Besides, with such circuits there is also the danger of resonant overvoltages due to upper harmonics. For these reasons it is often advantageous to connect parallel to the breaker S a resistor $r$ whose ohmic value is preferably made at least equal to the resistive component of the capacitive impedance $$\frac{1}{\omega C}$$

Then the opening of the breaker S switches a predominatingly resistive impedance into the line circuit. This has the consequence that, while the residual current $I'$ is somewhat increased, it is substantially placed in phase with the driving voltage and hence with the restriking voltage. The interruption with the aid of the switch $S'$ can now be effected in a simple manner. Besides, the line-current main circuit and the impulse circuit are strongly damped so that resonant overvoltages are avoided and the magnetic energy in the inductance L, as well as any magnetic energy obtaining in the line-current circuit, may convert themselves into heat within the resistor $r$.

If an alternating current breaker of a very high switching frequency is desired, it may be advantageous to open the breaker S each time in the vicinity of a zero passage of the current I while simultaneously closing the switch $S_c$. Then only a small impulse current is required because the instantaneous value of the line current I is likewise small, this having the effect that in the breaker S the consumption of which contact material due to the arcs 6 and 7 is as slight as possible.

While a circuit arrangement according to Fig. 7 is well applicable for relatively small values of energy and at moderate voltages, considerable difficulties are encontered with large energies because the continual reversal in the charge of the impulse capacitor requires large reactive energies that cannot be supplied from a shunt resistor as shown at 1 in Fig. 7. For alternating-current circuits operating under steady-state conditions or involving only relatively slow changes, a circuit arrangement can be used in which a small inductance is substituted for the shunt resistor 1 in Fig. 7 and in which a resonant circuit tuned to the line frequency is parallel connected to the small inductance. When the resonance condition is fully built up, the voltage across capacitor C is approximately proportional to the instantaneous value of the line current I.

Another possibility according to the invention is to produce the capacitor voltage $U_c$ proportional to the line current I by means of a small direct-current generator whose field is excited by the line current I. The drive motor for the generator is merely called upon to supply the frictional and magnetic losses. Such an arrangement, however, is preferred only in special applications.

Of course, it is also possible, in principle, always to apply an impulse of constant magnitude independent of the value of the line current I. However, then the most favorable interrupting conditions are not secured for the breaker S because the device would operate most favorably only for the largest instantaneous value of line current I to be interrupted, while with smaller instantaneous values of current the interrupting conditions would be detrimentally affected.

Since, as shown, it is difficult to satisfy the condition $U_c = k \cdot I$, particularly in alternating-current circuits, and since the satisfaction of this requirement by the means described above may involve a large expenditure, it may be preferable to introduce a constant value of $U_c$ while adapting the constants C, L, R, of the impulse circuit to the respective instantaneous values of the line current I. The embodiments of the invention described by way of example in the following are based upon this principle.

At first consider again a periodic impulse. As explained, the amplitude of the impulse current is defined by the equation $$\hat{I} = U / \sqrt{\frac{L}{C}}$$

Consequently, if the oscillatory resistance $$\sqrt{\frac{L}{C}}$$

is made inversely proportional to the current I in accordance with $$I \cdot \sqrt{\frac{L}{C}} = \text{a constant}$$

then the amplitude of the impulse current again adapts itself automatically to the instantaneous value of the line current I. The oscillatory resistance (wave resistance) can be varied, for instance reduced, by reducing the value of the inductance L with a constant capacitance of the capacitor C, or by increasing the capacitance with a constant inductance. Both have the result of changing the frequency of the impulse current $$f_c = \frac{1}{2\pi\sqrt{LC}}$$

In the first case, this frequency becomes smaller. In the second case, it becomes larger. However, the oscillatory resistance can also be changed by reducing the inductivity value L while increasing the capacitance value C in such a manner that on the average the product $L \cdot C$ is approximately constant. In the latter case, the natural frequency and hence the half-value duration remain approximately constant.

Figure 9:
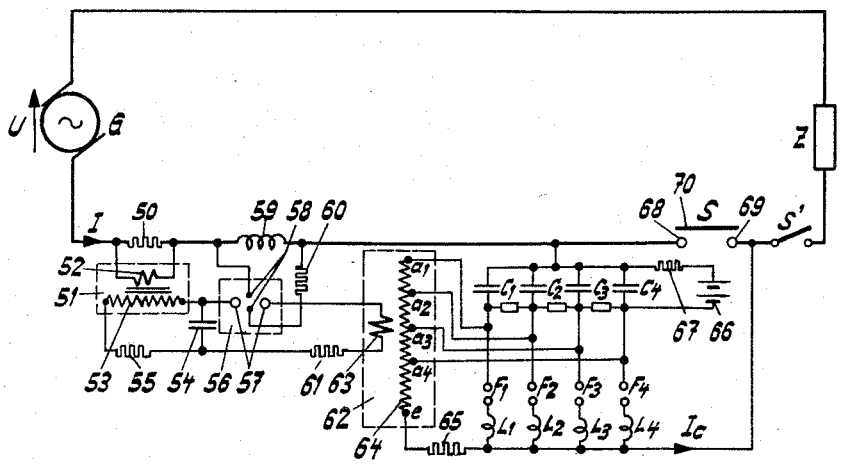

Figs. 8 and 9 show two examples of embodiments with changeable constants of the impulse circuit. The inductance L of the impulse circuit is designed as a reactor 20 consisting of an iron core 21 and of a coil 22 series connected in the impulse circuit, the reactor being provided with a pre-magnetizing winding 23 traversed by the line current I. The capacitor C is charged to a fixed voltage $U_c$ by means of a series circuit of a D.-C. source 20$a$ and a resistor 20$b$ connected across the capacitor. The larger the instantaneous value of the line current I, the higher is the premagnetization of the reactor 20 and the smaller is the effective inductivity of the coil 22. Therefore the condition $$I \cdot \sqrt{\frac{L}{C}} = p \cdot I \cdot \sqrt{L}$$

can be satisfied at least in approximation. The value $p$ in this equation is a constant proportionality factor.

Fig. 9 shows a circuit arrangement in which the switching-over of the capacitances and inductances is practically free of inertia and is effected by means of spark gaps, while additionally an automatic release occurs at excessively high instantaneous value of I or $dI/dt$.

As in the foregoing examples, an alternating or direct current generator G feeds a load Z through a breaker S in series with a residual-current switch S'. A shunt resistor 50 is series connected in the main circuit. The primary 52 of a current transformer of smallest possible stray losses is connected across the shunt resistor 50. The secondary 53, having a large number of turns, is connected with a capacitor 54 in series with a damping resistor 55. A quadruple arc gap device 56 with main electrodes 57 and auxiliary electrodes 58 has its auxiliary electrodes connected through a resistor 60 to the respective ends of a reactance coil 59 series connected in the main circuit. A discharge resistor 61 is connected in series with the primary 63 of a transformer 62 and in series with the main electrodes 57 of the arc gap device 56 across the capacitor 54. The transformer 62 has a high step-up ratio. Its secondary winding 64 has terminals and taps $a_1$, $a_2$, $a_3$, $a_4$ and $e$. Four capacitors $C_1$, $C_2$, $C_3$, $C_4$, are parallel connected with each other and are normally charged from a direct-voltage source 66 through a charging resistor 67, the charging voltage being in the order of magnitude of the maximum voltage value $\hat{U}$ of the generator G. Four spark gaps $F_1$, $F_2$, $F_3$, $F_4$, are series connected with the respective capacitors $C_1$ to $C_4$. Partial inductances $L_1$, $L_2$, $L_3$, $L_4$, are series connected with the respective spark gaps $F_1$ to $F_4$. The circuit breaker S comprises stationary contacts 68, 69 and a movable contact bridge 70.

The apparatus operates as follows:

The capacitor 54 is continuously charged through the transformer 51 by the voltage drop across shunt resistor 50 to a voltage proportional to the current I. The main arc gap 57 can be so adjusted that it commences to discharge at a given maximum value of I corresponding to a current-proportional voltage across capacitor 54. When this occurs, the capacitor 54 discharges an exponentially decreasing current through the primary winding 63 of transformer 62 and through the discharge resistor 61. The rate of current change of this discharge is directly proportional to the capacitor voltage and hence also proportional to the corresponding instantaneous value of the current I. As a result, a direct voltage is induced in the secondary winding 64, and this voltage has a magnitude which in approximation is practically also proportional to the instantaneous value of I. The capacitors $C_1$ to $C_4$ are now supposed to discharge individually or in groups through properly selected inductances $L_1$ through $L_4$ in such a manner that in each case $\hat{I}_c > I$ and $C \cdot L \approx k^2$. This requirement is satisfied in approximation by connecting the uppermost terminal point $a_1$ of secondary winding 64 with the upper electrode of the spark gap $F_1$, the tap $a_2$ with the upper electrode of spark gap $F_2$, and so forth, it being in some cases preferable to insert damping resistors in the respective connecting leads. If now the instantaneous value of the current I at the opening moment is small, the capacitor 54 is charged to a correspondingly small voltage, and the steepness of the current flowing in coil 63 of transformer 62 is likewise moderate. Accordingly, the secondary voltages between points $e$ and $a_1$ at the secondary winding 64 are supposed to be just sufficient to make the spark gap $F_1$ respond through the damping resistor 65. Then the capacitor $C_1$ discharges through the inductance $L_1$. That is, a relatively small capacitance now coacts with a large inductance. In contrast thereto, when the instantaneous value of current I at the interrupting moment is large, then the capacitor 56 is charged to a high voltage and the resulting discharge current is so steep that the voltage between points $e$ and $a_4$ suffices to ignite its corresponding spark gap $F_4$. Since the voltages at spark gaps $F_1$ to $F_3$ are considerably higher, all four spark gaps will now respond simultaneously. The four capacitors $C_1$ to $C_4$ are discharged through the parallel connected inductances $L_1$ to $L_4$; that is, a large total capacitance discharges through a relatively small total inductivity which is again so chosen that $\hat{I}_c > I$.

In both cases the currents I and $I_c$ act through the contact bridge 70 and along the two arcs in mutually opposing directions so that, as already explained, two current zero passages occur in rapid succession while, besides, the voltage at breaker S is approximately zero. Depending upon the exterior conditions, a residual current may continue flowing, this current being dependent upon the capacitive reactance of the capacitors $C_1$ to $C_4$. However, it may also happen that the spark gaps $F_1$ to $F_4$ will extinguish thus finally completing the interruption.

For the satisfactory performance of this circuit arrangement the following considerations are also significant. If it is desired to arbitrarily interrupt an operating current, then the procedure is preferably as follows. At first the breaker S is opened. As soon as the spacing between the contacts 68, 69 and the contact bridge 70 is sufficiently large, the main arc gap 57 is bridged, whereafter the interruption in breaker S will take place as just described. On the other hand, if an automatic release takes place due to the fact that the main arc gap 57 responds to an excessively high instantaneous current value and a correspondingly excessive voltage at the capacitor 54, or when the value $dI/dt$ is too large so that the correspondingly high voltage at reactor coil 59 causes the auxiliary arc gap 58 and subsequently the arc gap 57 to respond, then the breaker S must be released to open simultaneously with such a large acceleration of the contact bridge 70 that a sufficiently large contact spacing from the stationary contacts 68, 69 is reached after a very short interval of time, for instance, after about $10^{-4}$ seconds.

In principle, the main circuit may be closed also with the aid of the breaker S. However, since occasionally the breaker may close under overload or short circuit conditions, it is preferable to effect the closing of the main circuit with the aid of an auxiliary switch S' which may also be used for interrupting the residual current I'.

Figure 10:
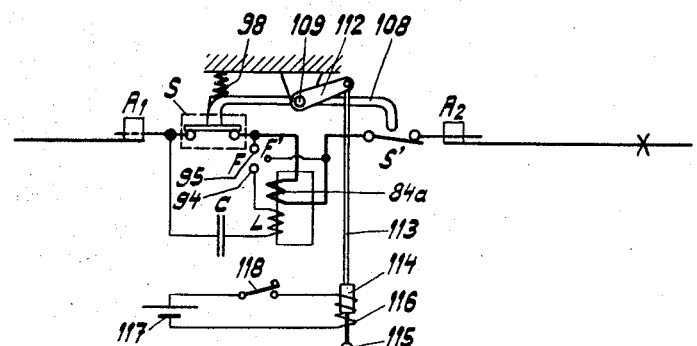
Fig. 10 illustrates schematically.
Figure 11:
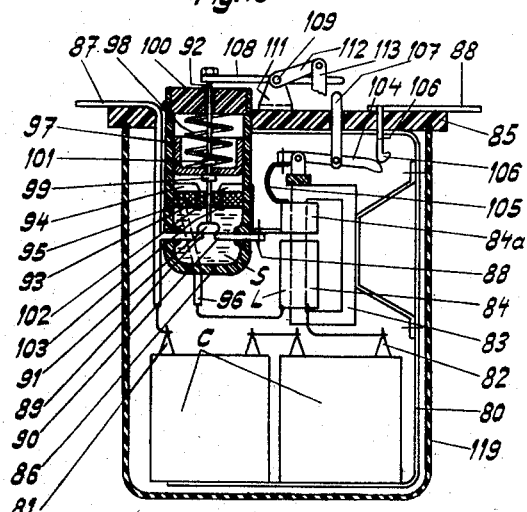
Figs. 11 and 12 show in vertical cross-section and in top view, respectively, an electro-mechanical embodiment of another circuit breaker according to the invention.
Figure 12:
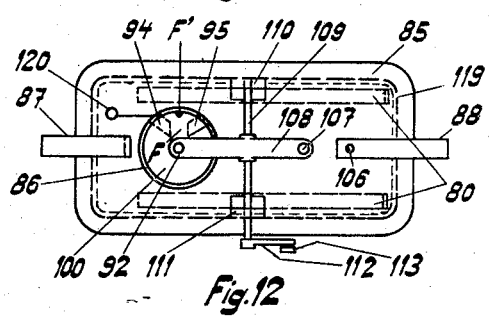

Fig. 10 shows schematically and in principle another apparatus according to the invention, a mechanical embodiment of the same being shown in vertical cross section in Fig. 11 and by a top view in Fig. 12. In Figs. 10 to 12 the circuit breaker is again denoted by S, the main capacitor by C, and the inductance by L, while F and F' denote the spark gaps of the impulse circuit. An auxiliary switch S' is provided for interrupting any occurring residual current and also for closing the main circuit. An inductance coil 84$a$ is connected in the main circuit and serves also for premagnetizing the reactor L. The two ends of coil 84$a$ are connected with the upper electrode of the spark gap F and with one electrode of the spark gap F' respectively. A double-armed lever 108 is rotatable about a pivot 109 and is connected with an arm 112 linked with an insulating release rod 113. The lower end of rod 113 carries a magnetic core 114 and a control handle 115. The core 114 is located in the magnetic field of a release control coil 116 which is energized from a source 117 under control by a switch 118. A spring 98 maintains the breaker S normally in closed position. The entire apparatus is suspended from connecting terminals $A_1$ and $A_2$. The operation of the apparatus is described below in conjunction with the description of Figs. 11 and 12.

According to Figs. 11 and 12, a U-shaped supporting structure 80 carries two capacitor units C electrically series connected with each other. The terminals 81 and 82 of the capacitor arrangement are series connected with an inductance L whose iron core 83 is secured to the structure 80 and which carries an impulse winding 84a. Also mounted on the supporting structure 80 is an insulating top plate 85.

The circuit breaker S comprises a cylindrical insulating housing 86. Two contact bars 87, 88 pass through the housing wall. Their respective ends 89 and 90 form the stationary contacts of the breaker S and cooperate with its movable contact bridge 91. Bridge 91 is connected with an actuating pin 92. Within the housing of the breaker the pin 92 traverses a disc 93 of high-ohmic resistance material which carries the electrodes 94 and 95 of a sliding spark gap. The electrodes 94 and 95, as apparent from Fig. 12, are both located at one side of the actuating pin 92 in spaced relation thereto. The electrode 94 extends downwardly and is joined with connecting lead 96, while the electrode 95 is conductively connected with the stationary contact bar 88.

A light-weight piston 97 is disposed above the electrodes and is biased downwardly by a spring 98 which abuts against a stop 99 on the actuating pin 92. The spring 98 provides for contact pressure between the stationary contacts 89, 90 and the movable contact bridge 91. The top of the insulating housing 86 is covered by a screw lid 100 which has a center bore traversed by the actuating pin 92. Disposed above the bottom of the piston 97 is another stop 101 on actuating rod 92. Stop 101 carries the actuating pin 92 upwardly when the piston 97 moves up, thus causing the circuit breaker S to open. Disposed above the contact bridge 91 are two contacts 102 and 103 in conductive connection with the respective electrodes 94 and 95. When the contact bridge 91 moves up, a connection between the electrodes 94 and 95 is established.

The auxiliary switch S' of the apparatus has a resiliently mounted contact bridge 104 connected by a flexible lead 105 with the coil 84a. The stationary contact 106 of the auxiliary switch S' is connected with the contact bar 88. The auxiliary switch is actuated by means of a pin 107. The lever 108 pivoted on pin 109 is linked with the actuating pin 92 of breaker S and cooperates also with the actuating member 107 of the auxiliary switch. The pivot pin 109 of lever 108 is mounted on brackets 110 and 111 (see Fig. 12) and carries at its front end a lever 112 linked with the releasing rod 113 leading to the releasing magnet 114, 116 (see Fig. 10) of the apparatus.

The apparatus is enclosed by a housing 119 preferably filled with insulating liquid such as oil. To permit charging the capacitors C, the electrode 94 is connected with a terminal 120 which, together with the contact bar 87, makes connection with the terminals of the capacitor arrangement accessible from the outside through the coil 84. The interior of the breaker S may communicate with the oil in housing 119 through a small opening (not illustrated). However, the breaker may also be filled with a different switching liquid or with a suitable arc quenching gas such as hydrogen, if desired, under pressure. For certain purposes it may be preferable to design the breaker S as a vacuum switch in the known manner. In that case, the actuating pin 92 is joined with a movable switch contact through a vacuum tight elastic diaphragm.

For interrupting the load current at any arbitrary moment, the release rod 113 as pulled down either by actuating the handle 115 (Fig. 10) or by operation of the releasing magnet 116. This turns the arm 112 and the lever 108 clockwise. The actuating pin 92 (Figs. 11, 12) moves up and lifts the contact bridge 91 off the stationary contacts 89 and 90. At the moment when the contact bridge 91 touches the contacts 102 and 103, the impulse circuit of capacitor C and inductance L starts discharging. The impulse current flows through the stationary contact 89 and through the lower end of the connection 87 to the terminal 81 of the capacitors C, thence from the terminal 82 of the capacitors to the coil 84 of the inductance L from the other end of which the impulse current passes through the connection 96 to the electrode 94. From electrode 94 the impulse current flows through contact 102, contact bridge 91, contact 103, and electrode 95 to the connecting bracket 88, thence to contact 90 of breaker S and through the arcs in breaker S to the contact bridge 91 back to the stationary contact 89. The current reduction in breaker S caused by the impulse current, and the artificial production of current zero passages causes the arcs in breaker S to be extinguished. In the meantime the lever 108 has turned a further amount and now presses with its right-hand end upon the pin 107. This causes the contact bridge 104 of the auxiliary switch S' to be lifted from the stationary contact 106 thus interrupting the residual current.

If a short circuit occurs, for instance at point X in Fig. 10, then the rapid change in current causes a high voltage to appear across the inductance 84a. As a result the auxiliary spark gap F' and hence also the spark gap F are ignited. For simplicity, only the electrodes of F and F' are shown in Fig. 12. After the ignition of the spark gap F between the electrodes 94 and 95 (see Fig. 13) a long hot spark plays upon the surface of the resistance disk 93. This produces an explosion-like heating of the air below the piston 97. The piston is forced up against the force of spring 98 and carries with it the contact bridge 91 through the actuation of pin 92 and its stop 101.

Tests have shown it possible to produce in this manner very high acceleration of the piston 97, so that the contact bridge 91, at the moment when the impulse current approaches its maximum, i. e. after $10^{-4}$ to $30^{-4}$ seconds, has already reached a sufficiently large contact spacing to secure a reliable extinction of the arcs in breaker S. It has also been described above that after the interruption in breaker S the capacitor C is inserted into the circuit as a substantial impedance. If additional interruption of the residual current is desired, the releasing coil is again excited and the auxiliary switch S is opened as described in the foregoing.

For closing the circuit, it is preferable to close the breaker S before closing the switch S'. This may, for instance, be done in a simple manner by delaying the closing movement of the switch S' by means of a small oil damping pump (not illustrated).

The circuit breaking apparatus as a whole may either be suspended directly from the power line, the apparatus according to Figs. 10 to 12 being designed for this type of support; or the apparatus may be mounted on auxiliary insulating supports. The releasing coil, of course, is at ground potential and is mechanically connected with the apparatus through the non-conductive release rod 113.

As explained above, the method according to the invention is applicable to direct-current as well as alternating-current installations. The described apparatus may be looked upon as combining a switch or breaker with a current limiter equipped for manual release, including overload release means (by operation of the shunt resistor 50 in Fig. 9), and means for release upon short-circuit (by operation of reactor 59 in Fig. 9). The structural components of such apparatus are simple and reliable. The switching energy required for operating the breakers S and S' is negligibly small, and the interruption is completed substantially after $1 \ldots 3 \cdot 10^{-4}$ seconds. As regards its use, such apparatus is limited neither with respect to current magnitude nor to voltage. Due to the negligible consumption of contact material, the apparatus may also be used to advantage in cases requiring high frequency switching operation. A decisive advantage, however, lies in the fact that, due to the current-limiting action of such an apparatus, no short circuit current at all can occur behind the apparatus so that the line is electrically stressed only by currents in the order of magnitude of the rated current. It is also an advantage that the magnetic energy of the load circuit, even though the interruption may not take place at a zero passage of the line current, can equalize itself within the circuits of the apparatus, a portion of this energy, in general, being taken up by the capacitors in the impulse circuit so that the occurrence of overload voltage is prevented to a large extent.

If the line circuit load is highly inductive the capacitance of the capacitor in the impulse circuit must be made relatively large because otherwise an excessively high voltage may occur, particularly at the capacitor, due to the liberated magnetic energy. According to another feature of the invention this is prevented by providing the impulse circuit with devices that limit the voltage at the capacitor to a predetermined value.

The simplest means to protect the capacitor from excessively high voltages consists in connecting a voltage limiter in parallel with the capacitor. Such a voltage limiter may consist of spark gaps, voltage-dropping resistors without or with spark gaps, tubular discharge devices of the arc-quenching or lightning-arrester type, and the like. If the voltage limiting device does not have additional resistance, it is generally necessary to convert into heat an essential portion of the magnetic energy in the arc occurring at the voltage limiting device. This may result in undesired consumption of contact material as well as in objectionable noise. Since it is necessary to extinguish any arcs that may occur at the voltage limiting device, it is preferable to provide a quenching device of a known type, such as an arc chamber with metallic or insulating partitions, magnetic blowing means, or an arrangement of gas-liberating means, such as fibrous material or urea products and the like, in the vicinity of the arc. For further minimizing the arc energy it is desirable to place a resistor in series with the arc gap. Then a substantial portion of the magnetic energy is dissipated as heat in the resistor. In certain cases it is also advantageous to connect an additional resistor in series with the parallel arangement formed by the capacitor and the voltage limiting device without or with a resistor. If at least one of the resistors is directly connected in the impulse circuit, then this resistor should preferably be non-linear so that its resistance remains practically constant at its minimum value during the short duration of the impulse current, for instance of $10^{-4}$ to $20^{-4}$ seconds, while it increases in value during the subsequent flow of equalizing current. Suitable for this purpose is, a resistor of pure iron or tungsten, because these materials have a high positive temperature coefficient of resistance. With iron, a hot resistance of ten times the cold resistance can be obtained without difficulty, thereby being effective to decrease the residual current being interrupted. Of course, the resistor must be of such power capacity as to be capable of dissipating the liberated magnetic energy of the circuit, including the energy subsequently supplied from the current source during the interrupting operation.

Generally, during the interrupting operation, at least one reversed charging of the capacitor in the impulse circuit will occur. Ordinarily, it would therefore be necessary to provide a larger capacitor rated for a correspondingly higher voltage. This disadvantage can be avoided by having the voltage limiting device become effective prior to the reversed charging of the capacitor, though not earlier than the zero passage of the resultant current in the interrupting gap, while the voltage limitation at the capacitor is being maintained until the impulse circuit is again interrupted by the auxiliary switch in the impulse circuit.

Figure 13:
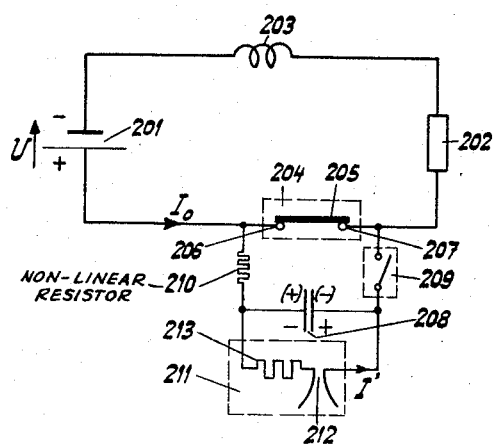
Fig. 13 is a schematic diagram of a modification of the invention for use with direct current wherein voltage-limiting means is provided in shunt with the impulse capacitor.

When disconnecting a direct-current load circuit, it may be desirable to superimpose an alternating current upon the residual current which at first builds itself up as a decaying direct current, the alternating current having, for instance, an exponential characteristic, with the result that at least one zero passage will occur. This may be done by causing the variable arc resistance of the voltage limiting device to excite oscillations in the oscillatory circuit comprising the capacitor of the impulse circuit and the additional inductances of the main circuit. Several embodiments exemplifying such devices are schematically shown in Figs. 13 to 18. The operation of the embodiment according to Fig. 13 is explained in the following with reference to the coordinate diagrams of Figs. 14 and 15.

According to Fig. 13 a direct-current source 201 (voltage U) energizes a main circuit comprising a load 202 (resistance R) in series with an inductance represented by a coil 203. This inductance may be the inherent inductance of the circuit. The main circuit is controlled by a circuit breaker 204 having a movable contact bridge 205 cooperating with two stationary contacts 206 and 207. Connected across the circuit breaker is an impulse circuit comprising a capacitor 208, an auxiliary switch 209 and a discharge resistor 210. A voltage-limiting device 211 lies parallel to the capacitor 208 and consists of a horn-type spark gap 212 in series with a resistor 213.

During normal operation the breaker 204 is closed, the auxiliary switch 209 is open, and the capacitor 208 is charged, with the polarity indicated by + and —, from a suitable charging device (not illustrated). The current I then flowing through the main circuit has the constant magnitude $I_0$ (Fig. 15) defined essentially by the ratio $U/R$.

Figure 14:
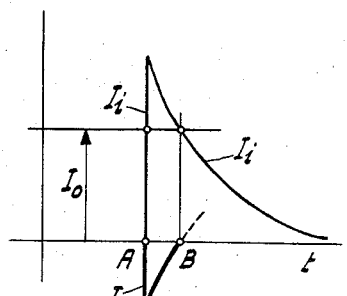
Figs. 14 and 15 are coordinate diagrams illustrating the operation of the embodiment shown in Fig. 13.

For interrupting the normal load current $I_0$, the switch 209 is first closed. This is assumed to occur at the moment A (Fig. 14). From that moment on, an impulse current $I_i$ flows through the circuit breaker 204 in opposition to the load current $I_0$. The resultant current $I_r$ then decays so that it has a first zero passage at moment A and a second zero passage at moment B. The breaker 204 is designed to finally interrupt the resultant current $I_r$ not later than at the second zero passage B. After moment B, the current (see Fig. 13) flows from source 201 through resistor 210, capacitor 208, switch 209, load 202 and inductance 203. Relative to this current flow, the source 201 and the capacitor 208 are connected in series. Consequently, the driving voltage is now formed by the sum $U+U_{c0}$, in which $U_{c0}$ represents the voltage at capacitor 208 at moment B according to Fig. 15.

Due to this increase in driving voltage, the current I at first increases (see point B in Fig. 15) and reaches a first maximum at time point C. Thereafter the current drops to point D and thence decays in dependence upon the amount of damping provided by the resistor 210 and load 202. The capacitor 208 (see Fig. 13) discharges. After issuing the impulse current, the voltage $U_c$ of the capacitor has dropped to $U_{c0}$ (see Fig. 15) and continues to decline until the capacitor is fully discharged at the moment C corresponding to the maximum value of the current I and hence to the maximum magnetic energy in the inductance 203. Now the magnetic energy discharges through load 202 and resistor 210 into the capacitor 208 thereby charging the capacitor 208 in the reverse direction. At the moment when the current A becomes zero (time point D in Fig. 15), the capacitor voltage reaches its negative maximum value $\hat{U}_c$ and from then on decays down to the value $-U$. The curve of the resultant voltage $U_r = U + U_c$ is shown in the lower portion of Fig. 15 by a broken line. This resultant voltage $U_r$ decays gradually to zero so that the auxiliary switch 209 can be opened under very favorable conditions, for instance at the time point E (Fig. 15).

Figure 15:
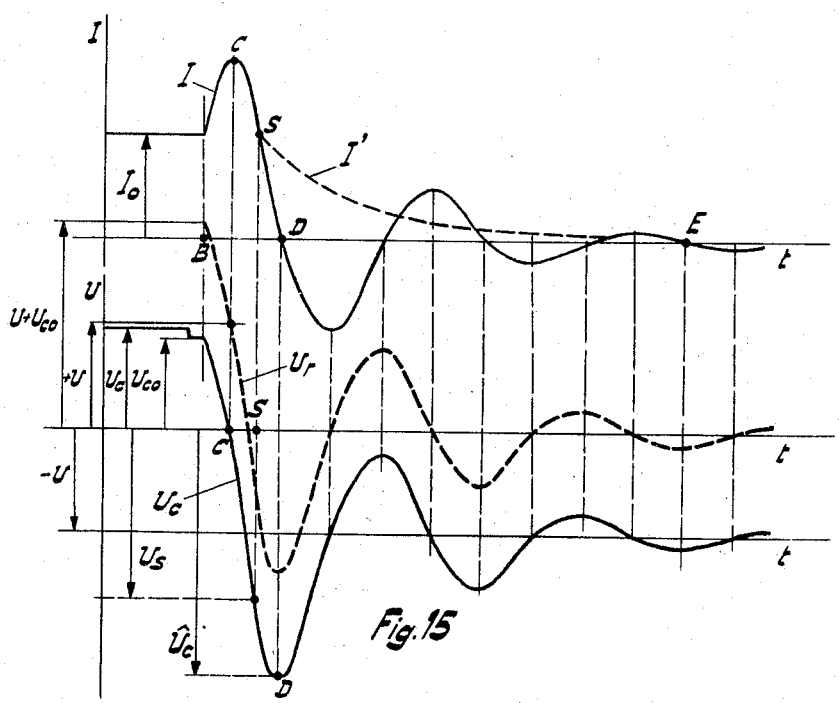

As is apparent from Fig. 15, the capacitor voltage reaches at moment D a value that may become rather high depending upon the magnitudes of the magnetic energy and of the capacitance of capacitor 208. Consequently, it would be necessary to either greatly increase the capacitance value or to select a capacitor for considerably higher voltages, both alternatives being uneconomical. The latter expedient is often also undesired because voltages of more than about 2.5 times the rated voltages may result in danger to the installation. These disadvantages, however, are eliminated according to the invention by connecting the voltage-limiting device 211 parallel to the capacitor 208. The voltage-limiting device may respond, for instance, at 1.5 times the rated operating voltage $U_s$ according to the time point S shown in Fig. 15. As a result, the voltage at capacitor 208 can practically be limited to the value $U_S$. Simultaneously with the ignition of the horn gap 212, the resistor 213 is additionally inserted into the circuit and dissipates the greater part of the magnetic energy originally accumulated in the inductance 203. A residual current I' will then flow through the circuit. This residual current is determined by the series resistors 202, 210 and 213, and may readily be kept so low that it is automatically interrupted by the operation of the horn-type spark gap 212. If such automatic interruption of the residual current does not take place, then the auxiliary switch 209 may be so designed that it is capable of interrupting the residual current, which is only a small fraction of the rated current.

Figure 16:
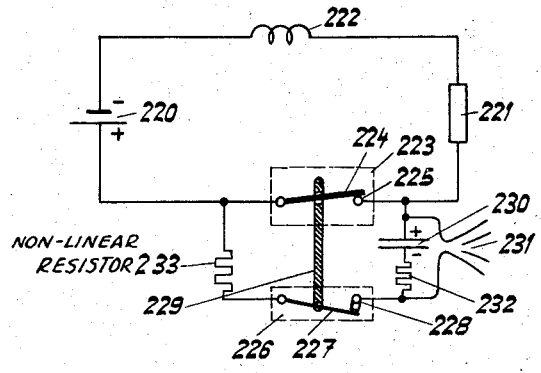
Figs. 16 and 17 are schematic diagrams illustrating further embodiments of the invention similar to that shown in Fig. 13.

In the embodiment of Fig. 16, a direct-current source 220 feeds a load 221 through a series impedance 222 under control by a circuit breaker whose movable contact bridge 224 cooperates with a stationary conact 225. An impulse circuit connected parallel to the circuit breaker comprises an auxiliary switch 226 whose contact bridge 227, coacting with a stationary contact 228, is coupled by a lost-motion insulating link 229 with the contact bridge 224 of breaker 223. The impulse circuit includes a capacitor 230 in series with a resistor 233. An arc quenching device 231 is connected in parallel relation to the series arrangement of capacitor 230 and resistor 232.

When the auxiliary switch 226 is closed, the capacitor 230 commences discharging through the breaker 223, and the breaker is then opened by means of the lost-motion insulating link 229 immediately after the closing of switch 226. Subsequently, the capacitor 230 is recharged with reversed polarity. When the magnetic energy is large, the quenching device 231 will respond with the effect that the capacitor 230 will partially discharge through the resistor 232. However, an equalizing current flows simultaneously from source 220 through resistor 233, auxiliary switch 226, quenching device 231, load 221 and inductance 222, thus dissipating in resistor 233 a major portion of the magnetic energy previously accumulated in the inductance 222. Here again it may be advantageous to make the resistor 233 of a material of a high positive temperature coefficient of resistance, for instance of a strip of pure iron, while selecting the current density so that the resistance reaches a temperature between 800 and 1000° C. at the maximum load.

Figure 17:
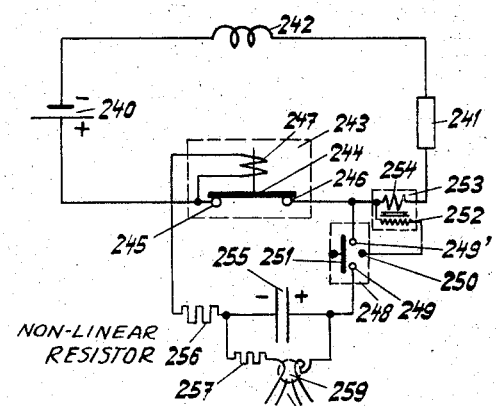

In the embodiment of Fig. 17, a direct current source 240 is connected to a load 241 in series with an inductance 242 and in series with a circuit breaker 243 with a movable contact bridge 244 cooperating with stationary contacts 245 and 246. The contact bridge 244 is controlled by a release coil 247. The impulse circuit connected across the circuit breaker 243 includes the release control coil 247 and an impulse capacitor 255 in series with a resistor 256 and in series with an auxiliary switch 248. The auxiliary switch is formed by two main electrodes 249, 249' and has an igniting electrode 250 and a contact bridge 251. The electrode 249' and the igniting electrode 250 are connected to the respective ends of a secondary winding 252 in a transformer 253 whose primary winding 254 is series connected in the main circuit. Connected parallel to the capacitor 255 are a resistor 257 and an arc quenching device 258 in series relation to each other. The arc quenching device 258 has a magnetic blow-out coil 259.

The functioning of the apparatus according to Fig. 17 is basically similar to that of Fig. 16. If the contact bridge 251 of the auxiliary switch 258 is moved toward the right, for instance manually, the impulse circuit is closed and the releasing control coil 247 of the main breaker 243 is excited simultaneously. When the inductance 242 has a moderate value, oscillations will take place which are damped mainly by the resistor 256, while the quenching device 258 will not respond. With large magnetic energies, however, an arc will occur in the energizing device 258 thus additionally inserting the resistor 257 into the circuit. After extinction of the arc, facilitated by the magnetic blowing effect of coil 259, the auxiliary switch 248 can be opened free of current and voltage. An automatic interruption is initiated with the aid of the transformer 253. When the current in the primary winding 254 increases suddenly, a high voltage is induced in the secondary winding 252. This causes a discharge to occur between the electrodes 249' and 250 immediately followed by the ignition of an arc between the electrodes 249 and 249'. From that moment on the further functioning is as described in the foregoing.

Figure 18:
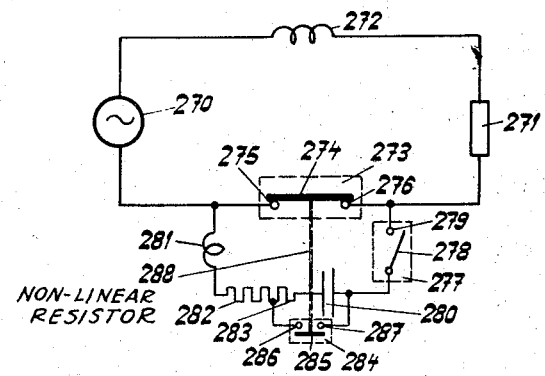
Fig. 18 is a schematic diagram illustrating a modification for use with alternating-current and including means to prevent reverse charging of the impulse capacitor.

In the embodiment of Fig. 18 a reversed charging of the impulse capacitor is prevented. In its embodiment an alternating-current source 270 feeds a load 271 through an inductance 272 under control by a circuit breaker 273 comprising a contact bridge 274 and stationary contacts 275, 276. The impulse circuit is controlled by an auxiliary switch 277 designed as a power breaker. The contact bridge 278 of switch 277 coacts with a stationary contact 279. The impulse circuit further comprises an impulse capacitor 280 in series with an inductance 281 and in series with two resistors 282, 283. Resistors 283 and 280 are bridged by a switch 284 having a contact bridge 285 and two stationary contacts 286, 287. The contact bridge 285 is coupled by an insulating rod 288 with the contact bridge 274 of the main breaker 273.

After closing of the auxiliary switch 277 the main breaker 273 is to open immediately, this sequential operation being secured, for instance, by means as described with reference to Figs. 16 and 17. Before the capacitor 280 has fully discharged, the switch 284 is closed thus preventing a reverse discharging of the capacitor. After the magnetic energy is dissipated, particularly in resistor 282 and load 271, the auxiliary switch 277 opens and is now called upon to interrupt only any residual and substantially non-reactive alternating current. It is preferable in this case also to make the resistor 282 of a material of a high positive temperature coefficient of resistance in order to reduce the arc energy imposed upon the contacts of the auxiliary switch 277.

Figure 19:
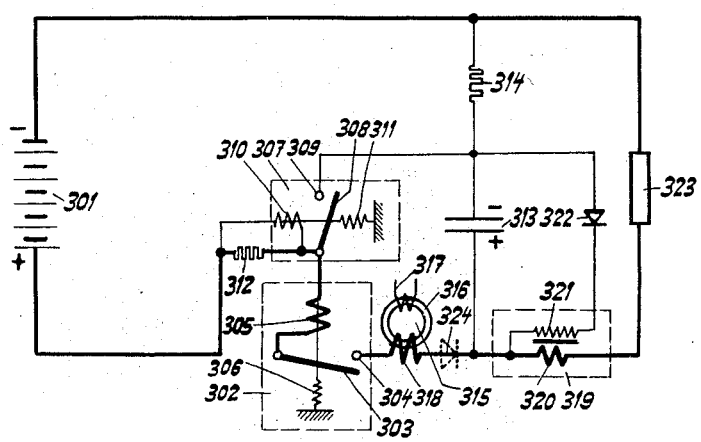
Fig. 19 is an embodiment of the invention similar to that of Fig. 18 but for use with direct current.

An embodiment essentially well suitable for the interruption of direct-current circuits is exemplified in Fig. 19. A direct-current source 301 in form of a storage battery energizes a load 323 under control by an electromagnetically actuated main breaker comprising a contact bridge 303, a stationary contact 304, a holding coil 305, and a releasing system 306 represented by a kick-out spring tending to keep the breaker in the open position. The impulse circuit extending across the breaker 302 comprises an auxiliary switch 307 with a movable contact bridge 308, a stationary contact 309, a switch-on winding 310 and a kick-out spring 311. The switch-on winding is connected parallel to a resistor 312 of the main circuit. The impulse capacitor 313 is charged through a resistor 314 from the source 301 when the main breaker 302 is closed and the auxiliary switch 307 is open. Series connected in the main circuit is the main winding 318 of a saturable commutating reactor 315 whose iron core has an air gap as at 316. A premagnetization winding 317 energized by a suitable D.-C. source (not shown) is also provided on the reactor 315. A current transformer 319 has its primary winding 320 also connected in the main circuit. The secondary winding 321 of current transformer 319 has one end connected through a valve 322 with the negative pole of the capacitor 313, while the other end is attached to the positive pole.

The apparatus operates as follows. When the main breaker 302 is being closed, for instance manually, a current commences to flow from the positive pole of source 301 through resistor 312, holding winding 305, contact bridge 303, main reactor winding 318, primary winding 320, load 323 and back to the negative pole of source 301. Thereafter, the holding winding 305, now excited, prevents the contact bridge 303 from opening.

Immediately after the closing of contact bridge 303, the commutating reactor is reversely magnetized and hence passes through the unsaturated range of its magnetic characteristic thus temporarily assuming a very high reactive impedance. As a result, the current that commences to flow from source 301 through the main circuit, is at first kept at a very low value for a certain interval of time (step interval), thus preventing the occurrence of welding between the contact bridge 303 and the stationary contact 304. Simultaneously with the closing of breaker 302, the capacitor 313 is connected through the resistor 314 to the voltage source 301 and commences charging. If the current transformer 319 is used, it will promote the charging operation of the capacitor because the secondary winding 321 and the valve 322 are so connected that the left-hand end of the secondary winding 321 assumes positive polarity and the right-hand end negative polarity while the current in primary winding 320 is increasing. A discharge of the capacitor is prevented by the valve 322.

If now the auxiliary switch 307 is closed, either manually or by excitation of the switch-on coil 310 due to overload current, the capacitor 313 discharges through the main winding 318 of reactor 315, contact bridge 303, holding winding 305, and contact bridge 308. The discharging current is opposed to the main current flowing through the contact bridge 303 and thus weakens the resultant current in breaker 302 and holding coil 305. At the moment when the force of the kick-out spring 306 exceeds the holding force of coil 305, the contact bridge 303 commences to move in the circuit-opening direction. The resultant current declines down to its zero value, whereafter any arc occurring between the contact bridge 303 and the contact 304 is extinguished. Besides, the deionization is substantially facilitated by the switching-off step produced by the commutating reactor 315. The apparatus may also be so designed that the contact bridge 303 separates from the stationary contact 304 only at the beginning of the switching-off step so that a practically arc-free interruption can be obtained.

After complete interruption in breaker 302, an equalizing current commences to flow through switch 307, capacitor 313 and load 323, this equalizing current being additionally damped by the resistor 314. Besides, a small direct current flows through the switch 307 and the resistor 314. After decay of the equalizing current, the switch 307 can be opened practically free of current and voltage, thus completing the interrupting operation.

The current transformer 320 has mainly the function of additionally charging the capacitor to a higher voltage in the event of a steeply increasing overload current so that the counter-current in this case is also of approximately the same magnitude as the direct current to be interrupted.

Instead of the commutating reactor 15, any other device for temporary limitation of current may be used, for instance a valve 324 such as a barrier-layer electrifier as indicated in Fig. 19 by a dotted line. In this case the full direct current will at first flow through the valve 324. When the auxiliary switch 307 is closed, the resultant current passing through the valve will decline but at first continues flowing in the conducting direction of the valve until the current zero passage is reached. If no valve were used, the direction of the current flow would now reverse. This, however, is made impossible by the valve 324. The current, therefore, remains approximately zero so that there is again a weak-current interval (step interval), during which the main breaker 302 will open. From the opening moment on, the blocking voltage is impressed between the contact bridge 303 and the stationary contact 304 so that the valve 324 is no longer stressed. Consequently, the valve 324, in general, need be rated for only small inverse voltage.

The phenomena occurring during the initial stage of the interrupting operation are essentially commutation phenomena; that is, the flow of load current previously passing through the main breaker is at first transferred to the auxiliary switch so that the direct current continues flowing but now passes through the auxiliary switch 307 and the capacitor 313 while charging the capacitor in the reverse direction. If the load is predominantly resistive, the charging of the capacitor is aperiodically damped. The flow of current through the auxiliary switch 307 ceases at the moment when the capacitor 313 charge reaches the voltage of the source 301. Now the switch 307 can be opened practically without current and voltage loading. However, if the load 323 is predominantly inductive, a damped oscillation commences after the opening of the main breaker 303, and the above-described current-free condition is reached only after decay of this oscillation. It is therefore preferable to open the switch 307 with some delay because then the stress imposed upon the switch becomes negligibly small. The decay of the oscillation can be accelerated by suitable damping means in the usual manner.

In direct-current lines that may encounter a reversal in current flow direction, it is necessary to either use a second capacitor of the opposite polarity or, when using a phase controlling capacitor, to reverse the poling of the latter. Such expediences are required to a more pronounced extent in alternating-current breakers because of the reversal in current flow occurring in each period of the alternating-current cycle.

Figure 20:
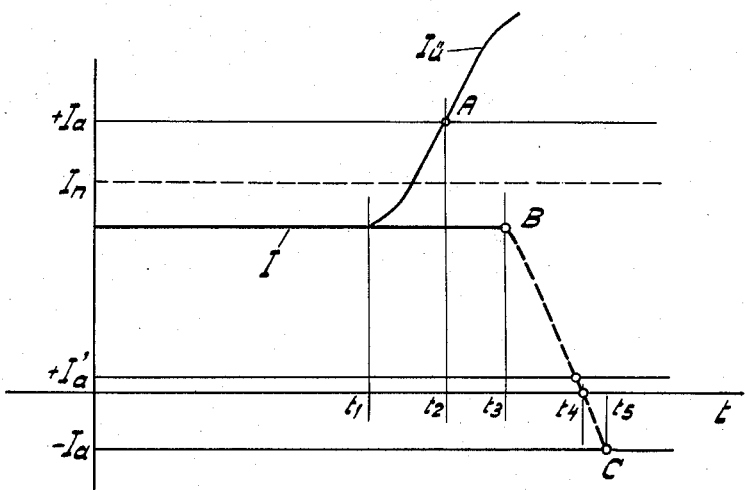
Figs. 20 and 21 are coordinate diagrams illustrating commutation currents due to switching in circuit breakers according to the invention, the diagrams being for A.-C. and D.-C. circuits, respectively.
Figure 21:
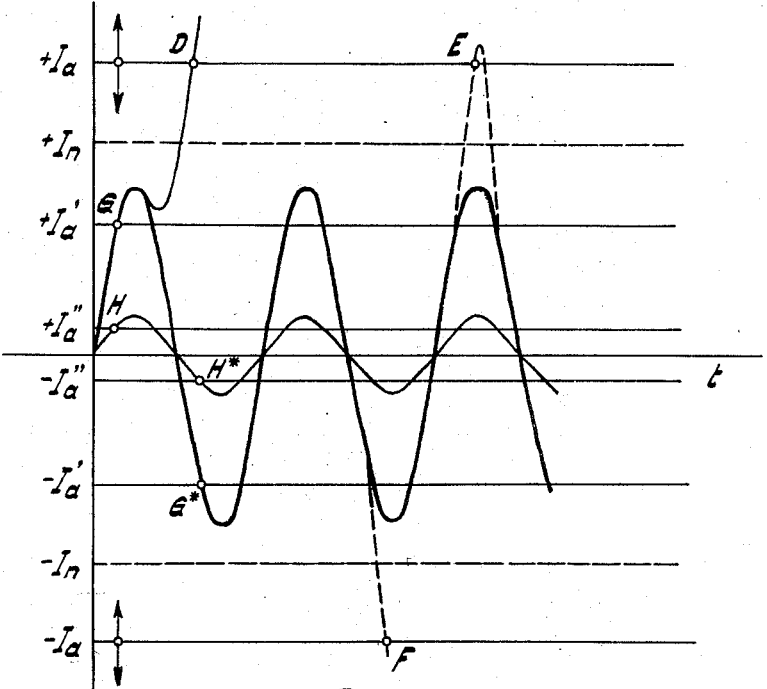
Figure 22:
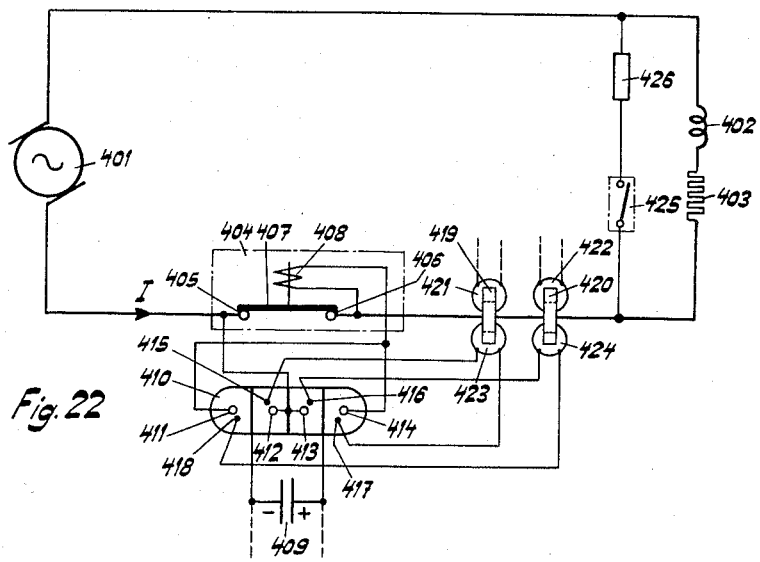
Figs. 22 and 23 show respective A.-C. and D.-C. circuit breakers according to the invention equipped with pole reversible capacitors and adjustable for critical release.
Figure 23:
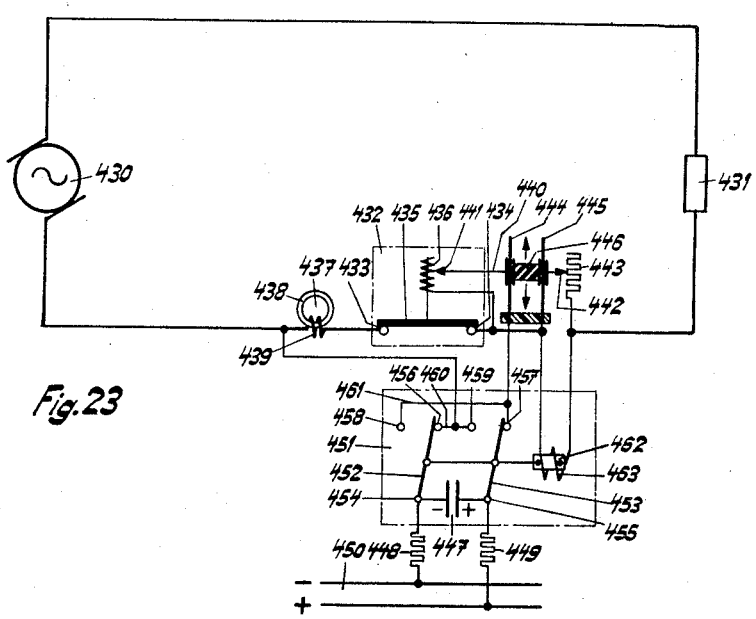

These phenomena will now be elucidated in greater detail with reference to Figs. 20 and 21. The two diagrams relate to direct current and alternating current respectively. Figs. 22 and 23 show respective embodiments of circuit breaker systems that are equipped with pole-reversible capacitors and operate upon occurrence of critical releasing values preadjusted to given magnitudes.

In the diagram of Fig. 20, a positive direct current is denoted by the line I. The rated current of the main breaker is represented by the broken line $I_n$, the adjusted positive maximum value of the releasing current magnitude by $+I_a$, and the negative releasing current, adjusted to a considerably smaller value, is represented by $-I_a$. Assume that an overload current $I_u''$ occurs at the moment $t_1$ and that this overload current reaches the value $+I_a$ at point A corresponding to the moment $t_2$ so that the circuit breaker is released in the manner described below. The case of a current reversal is entered in broken lines. The current I commences to decline from point B at the moment $t_3$ and passes through zero at the moment $t_4$, thereafter reaching the negative releasing value $-I_a$ at point C corresponding to the moment $t_5$, thus causing the breaker to open.

In principle, the release of the breaker may even be effected at the time point $t_4$; that is, the negative releasing current $-I_a$ would then be practically zero or may even have a slightly positive value $+I_a'$. It will be seen from Fig. 20 that, with respect to release by overload current, it does not matter whether this overload current is caused by overloading of the main circuit, by occurrence of a short circuit, or by an artificial overload current produced, for instance, by temporarily inserting an additional load parallel to the actual load behind the circuit breaker. Under any such conditions the interruption always occurs at the predetermined values $+I_a$, or $-I_a$, $I_a'$ to which the amplitudes of the impulse currents can be adapted in a simple manner. Particularly the amplitudes of the impulse current are to be reduced in proportion to any reduction of the release current magnitude $+I_a$ or $-I_a$.

Fig. 21 illustrates the corresponding conditions for alternating current. An interruption may take place at time point D due to occurrence of a short circuit with a positive current-flow direction, or at point E due to overload. Point F relates to the case of an interruption due to a short circuit of negative current-flow direction. While it was assumed in Fig. 20 that the releasing current values $+I_a$ or $-I_a$ are always preadjusted to a fixed value and that an arbitrary interruption is effected by an additional load, the conditions represented in Fig. 21 differ in assuming that the arbitrary interruption is released by diminution of the values of $+I_a$, for instance, down to $+I_a'$ or $+I_a''$, with the result that interruption occurs at point G or H. This happens exactly in the same manner on the negative side, the interruption then occurring at point G* or H*.

In the embodiment of Fig. 22, an alternating-current source 401 is shown to energize a load composed of inductance 402 and resistance 403. The main circuit is controlled by a circuit breaker 404 having stationary contacts 405, 406 and having a movable contact bridge 407 controlled by an operating coil 408. The impulse circuit, connected across the circuit breaker contacts, includes the control coil 408 and is equipped with the impulse capacitor 409. The capacitor is continuously connected through leads (illustrated by broken lines), and through correspondingly large resistors (not illustrated), to a charging device (not illustrated). Connected with the capacitor 409 is a multiple arc-gap device 410 with main electrodes 411, 412, 413, 414, and auxiliary electrodes 415, 416, 417, 418. Two iron cores 419, 420 are inductively linked with the main circuit and hence with the main current I. These cores have a magnetic hysteresis characteristic as closely rectangular as possible. The cores are premagnetized by means of coils 421, 422 respectively, and carry secondary coils 423, 424 respectively. Coil 423 is connected with the auxiliary spark gaps 415 and 417. Coil 424 is connected with the auxiliary spark gaps 416 and 418. A small power breaker 425 is series connected with an auxiliary load 426 across the main load and is rated for interrupting the branch current flowing through the auxiliary load 426.

When the load current I is smaller than the given release current magnitude $I_a$, neither the core 419 nor the core 420 is reversely magnetized because of the preadjusted premagnetization. Under such conditions, therefore, the auxiliary spark gaps 415, 417 or 416, 418 are not impressed by voltage. However, when the positive half wave of current I reaches a maximum value larger than the preadjusted and opposingly directed premagnetization, then the core 419 is reversely magnetized so that a high voltage is induced in coil 423 and ignites the auxiliary spark gaps 415 and 417.

Now the capacitor 409 discharges from its positive pole through arc gap 414, releasing coil 408, contact bridge 407, and electrode 412 to the negative pole. Consequently, the impulse current is opposed to the current I in the breaker 404 thus effecting the interruption in a simple manner. If, however, the negative half wave produces an amplitude larger than the corresponding premagnetization, the core 420 is reversely magnetized and the auxiliary spark gaps 416 and 418 are ignited thus causing the capacitor 409 to discharge through the main breaker 404 in the opposite direction.

It is essential that the current interruption occurs at substantially the same current value $I_a$. This value can be adjusted by varying the premagnetization of the cores 419 and 420. As a result, the impulse current adapts itself automatically to the instantaneous value of the current to be interrupted. The number of ampere turns of coil 408 and hence the accelerating force imposed upon the contact bridge 407 is always the same. For securing this outstanding advantage also for the purpose of arbitrary interruption, interruption in this case is effected by closing the switch 425. The resistance of the auxiliary load 426 is so rated that the current flowing through it is at least sufficient to reverse the magnetization in one of the two cores 419 and 420, depending upon the instantaneous current flow direction.

If the energizing conditions of the line are unequivocal, as is the case in Fig. 22, then the circuit is virtually completely interrupted and the switch 425 is thereafter required to interrupt only a slight residual current. If the right-hand side of the main circuit includes another current source, then the switch 425 must be capable of interrupting a virtually ohmic current having a magnitude of one to two times the rated current, and this requirement can generally be met without difficulty. The resistor 426 may have a relatively small size because it is subjected to only short-lasting loads even when large energies are involved.

It will, therefore, be seen that the provision of the two transformers 419 and 420, in conjunction with the spark gap device 410 and the auxiliary switch 425, affords in a simple manner a reliable interruption under similar current conditions and with automatic adaptation to the instantaneous direction of the main current.

In the embodiment of Fig. 23, the alternating current source 430 energizes a load 431 under control by a main circuit breaker 432 with stationary contacts 433, 434 cooperating with a movable contact bridge 435 controlled by a coil 436. A small saturable commutating reactor 437 with an iron core 438 has its main winding 439 series connected between source 430 and breaker 432. The control coil 436 has a tap contact 441 mounted on an adjustable slider 440 which also carries a slide contact 442 displaceable along a resistor 443. The two slide contacts 441 and 442 are conductively connected with respective slide bars 444 and 445 separated from each other by an insulator 446. The impulse capacitor 447 connected across the main breaker 432 is charged through resistors 448 and 449 from a direct current line 450. The capacitor is connected with the rest of the impulse circuit through a reversing switch 451 that is electromagnetically actuated to oscillate at the line frequency. The oscillating switch comprises swing arms 452 and 453 connected with the capacitor terminals 454 and 455 respectively. The swing arms cooperate with stationarily mounted pairs of contacts 456, 457 and 458, 459. The contacts 456 and 459 are connected with each other by a lead 460, and the contacts 457 and 458 are connected by a lead 461. The swing arms 452 and 453 are linked to a polarized magnet core, for instance a permanent magnet, in the field of a coil 463.

During normal operation, the arms 452 and 453 oscillate between the contacts 456, 458 and 457 and 459 without ever touching any of these contacts or approaching them so closely that the capacitor 447 can discharge. The oscillation is excited directly from a portion of the main current determined by the magnitude of the properly adjusted resistor 443, this partial current flowing through the coil 463 and acting upon the polarized magnet core 462. The oscillating switch 541 should be given a natural frequency, for instance of 500 or 600 C. P. S., that is, considerably higher than the line frequency (50 or 60 C. P. S.).

When the instantaneous value of the current I and hence the partial current flowing through the coil 463 exceeds a predetermined value depending upon the position of the slide contact 440, then the oscillating system 452, 453 comes into engagement either, as shown, with the contacts 456, 457 or with the contacts 458, 459, depending upon the flow direction of the instantaneous current. As a result, the capacitor 447 discharges in such a manner that the contact bridge 435 in the main breaker 432 is traversed by an impulse current opposed to the current I. This impulse current reverses the magnetization of the commutating reactor 437 at the current zero passage thus producing in the main circuit a weak-current step for an interval of time within which the contact bridge 435 is separated from the contacts 433 and 434 of breaker 432. Thereafter the residual current flows through the capacitor 447 and can be interrupted in a simple manner, for instance by switches as normally present in alternating-current lines. If a direct-current line is involved, the swing arms 452, 453 adjust themselves to the instantaneous value of the direct current I existing at any moment and cause the capacitor to discharge in the correct direction only upon occurrence of overload current.

As mentioned, the critical releasing current value can be pre-set by properly adjusting the resistor 443 with the aid of the slide contact 442. If the resistance of resistor 443 is small, that is, if the slide 442 is shifted far downward, only a small partial current I flows through the coil 463 so that the release takes place at correspondingly large values of current. In this case, the relatively small number of ampere turns of coil 436 is sufficient for properly accelerating the contact bridge 435 in the opening direction. This is the reason why the slide contact 441 is coupled with the slide contact 442 by the insulator 446. Since the inductivity changes with the square of the number of winding turns while the impedance in the impulse circuit changes only with the square root of the inductivity, it will be recognized that, for instance, with one half of the number of turns, a current of double magnitude will flow in coil 436 while the number of ampere turns remains constant. This is a simple means of maintaining the excitation of coil 6 always at the same value and thus the acceleration of the contact bridge 435 also at the same value regardless of the particular overload setting to which the slide contact 440 may be positioned.

The described apparatus is especially of advantage for direct-current lines of reversible polarity, but as explained it may also be used for alternating-current lines.

A particular advantage of circuit breaker devices according to Figs. 22 and 23 resides in the fact that the impulse capacitor 409 in Fig. 22 or 447 in Fig. 23 is galvanically isolated from the line during normal operation. Consequently, there are no direct connections between the leads of the line, especially between the phase leads of a three-phase line. This has the consequence that all circuit breakers of a station and all phases of the power transmission system may be equipped with a single direct-current charging system (450 in Fig. 23) which may serve not only for charging the impulse capacitors but indirectly also for actuating the main circuit breakers.

Figure 28:
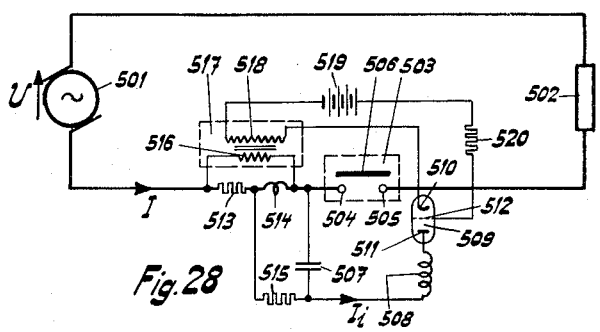
Figs. 28 through 31 are embodiments of the invention operating in accordance with the principles described in connection with Figs. 24 through 27.
Figure 29:
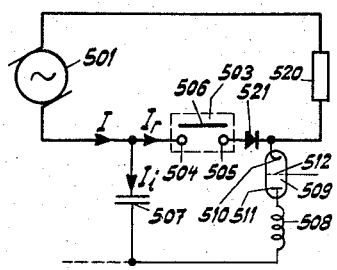
Figure 30:
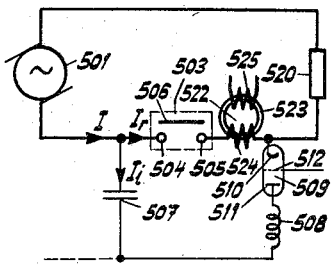
Figure 31:
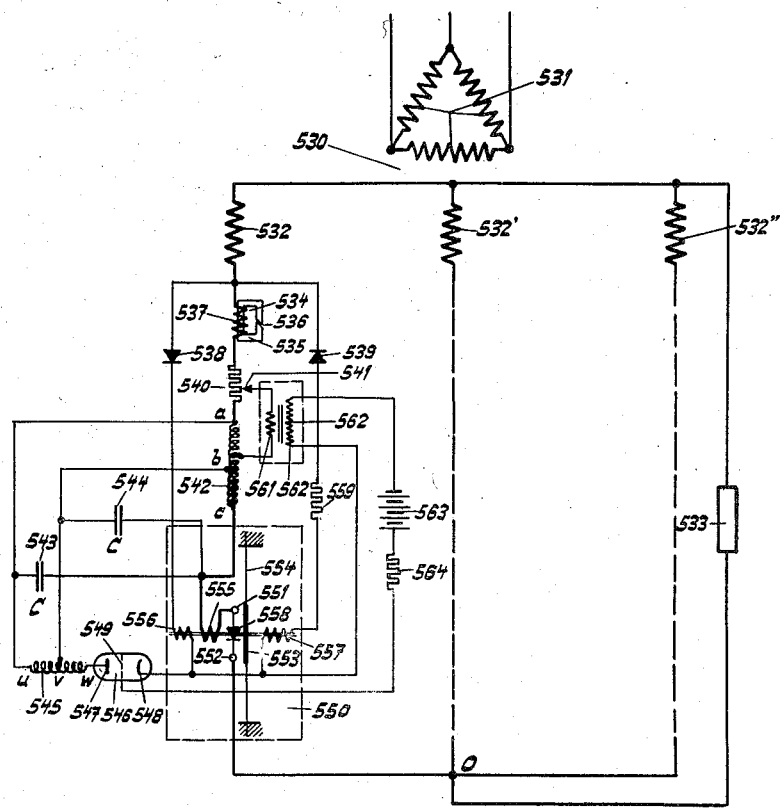

With alternating current breakers, particularly for high switching frequencies, it is in many cases preferable to superimpose the impulse current on the line current in the vicinity of the natural zero passage of the line current. This permits producing a weak-current interval (step) during whose duration the main breaker is opened. The principle of thus producing a weak-current step interval with the aid of an impulse circuit will at first be explained with reference to the diagrams of Figs. 24 to 27, while Fig. 28 shows an embodiment incorporating this feature in conjunction with an alternating-current breaker, and Figs. 29 to 31 illustrate corresponding embodiments of rectifiers.

In the current-time diagrams of Figs. 24 to 27, the curve I denotes the load current to be interrupted, this current passing through the zero passage 0 with a certain steepness. The impulse current is denoted by $I_i$, and the resultant current flowing through the breaker is denoted by $I_r$.

Figure 24:
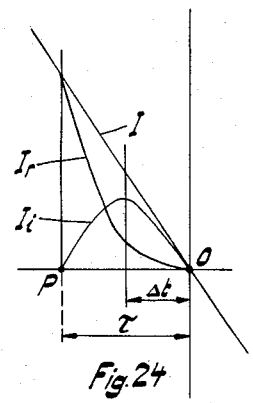
Figs. 24 to 27 are coordinate diagrams illustrating the operation of still another modification of the invention wherein the impulse current is imposed on the line current in the vicinity of its natural passage through zero.

According to Fig. 24, the sinusoidal impulse current $I_i$ commences to flow at the time point P an interval $\tau$ ahead of the zero passage 0. The wave shape of the impulse current $I_i$ is such that its tangent coincides with the wave of current I at the zero passage 0. The resultant current $I_r$ has a weak-current step during the step interval $\Delta t \approx \tau/2$.

Figure 25:
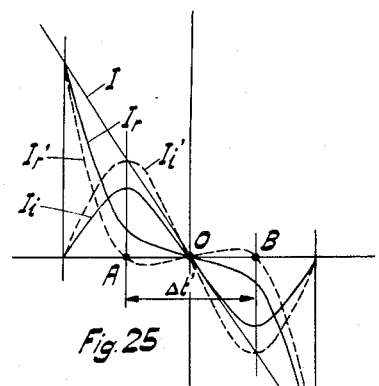

In Fig. 25 it is assumed that the impulse current $I_i$ flows during two half waves. This results in a zero-current interval approximately equal to $\tau$. If the impulse current is made somewhat larger than $I_i$ (indicated by a broken-line curve $I_i'$), a step interval $\Delta t'$ is produced and the step current has three zero passages at A, 0 and B.

Figure 26:
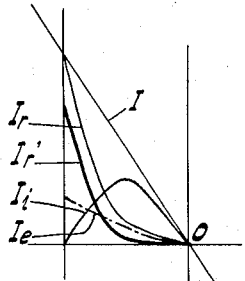

Fig. 26 shows the superposition of a sinusoidal impulse current $I_i$ and a properly selected, exponentially decaying impulse current $I_e$. The superposition of these two impulses permits keeping the step current $I_r'$ at a very low value, this being of considerable advantage particularly for rectifiers.

Figure 27:
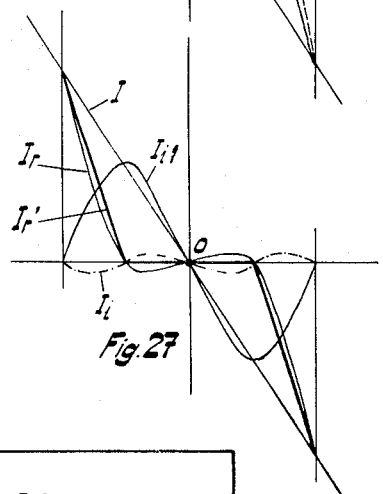

Fig. 27 shows the superposition of two sinusoidal step currents $I_{i1}$ and $I_{i2}$ corresponding to a Fourier analysis of the current wave of I. This also permits a corresponding reduction in step current $I_r'$. By adding further upper harmonics, the step current $I_r'$ can be brought to any desired low value during a predetermined interval of time.

According to Fig. 28, an alternating-current source energizes a load 502 of any kind under control by a circuit breaker 503 with stationary contacts 504, 505 and a contact bridge 506. The impulse circuit, whose capacitor and inductance are denoted by 507 and 508 respectively, comprises a triode having electrodes 510, 511 and a control grid 512. A resistor 513 of a low resistance value $r$ is series connected with an inductance 514 of the magnitude $\lambda$ in the main circuit. The inductance 514 is connected across capacitor 507, if desired, through a resistor 515. The primary winding 516 of a voltage transformer 517 is connected across the series connection of resistor 513 and inductance 514. The secondary winding 518 of transformer 517 is connected in series with a battery 519 and a grid resistor 520 to the grid 512 or directly with the electrode 510 of the triode 509.

The apparatus operates as follows: When an alternating-current from source 501 is flowing through the breaker 503 and the load 502, the inductive voltage drop of inductance 514 is impressed upon the capacitor 507. Since the rate of current change $\dot{I}$ ($=dI/dt$) is proportional to the maximum value of I, the capacitor charging voltage increases with an increase in the current I. This charging voltage is proportional to I, that is:

$$U_c = k \cdot \dot{I}$$

The apparatus is so designed that during increasing values of current, the sum of the voltage drops of resistor 513 and of inductance 514, together with the voltage of the battery 519, produce a negative bias for grid 512 of triode 509. When the current I commences to decline from its maximum and to approach its zero passage, the polarity of the voltage drop at inductance 514 reverses. The voltage drop of resistor 513 decreases simultaneously but retains its original polarity. At a definite time point $\tau$ prior to the current zero passage, the two voltage drops are equal. Immediately thereafter, the voltage drop of inductance 514 becomes predominant. This bias voltage on grid 512 of triode 509 turns positive, thus igniting the triode so that the capacitor 507 discharges through the inductance 508 and the contact bridge 506.

According to the invention, the amplitude and frequency of the impulse circuit are so chosen that the impulse current $I_i$ adapts itself in the vicinity of the current zero passage to the current I to be interrupted. Since the ignition time $\tau$, corresponding to the equation $\tau = \lambda/r$, depends only upon the ratio $\lambda/r$ and hence can be chosen arbitrarily, the ignition can always take place at a fixed predetermined time point relative to the current zero passage irrespective of the magnitude of the main current I. During the weak-current interval thus produced, the breaker 503 is opened and is then practically free of any current and voltage load. At the moment when the impulse current $I_i$ passes through zero, the triode 509 stops conducting, the impulse circuit is interrupted, and the interruption of the load current in the main circuit is completed (see Fig. 24).

With the described apparatus, therefore, only the one half wave of the impulse current occurring prior to the zero passage is utilized. If it is desired to also utilize the second half wave in order to obtain a weak-current interval of double duration (see Fig. 25), two triodes must be used and must be connected to operate in counter rhythm, one of these triodes operating in the above-described manner while the second triode, having its grid made more positive, permits the opposingly directed impulse half wave to pass through. After completion of the main current interruption, the grids must be connected in the conventional manner to a negative cut-off bias. However, the two triodes may also be replaced by a suitable control switch, for instance a vacuum switch, with the aid of which the impulse current is switched on and off.

The embodiment shown in Fig. 29 is closely similar to that of Fig. 18, corresponding elements being denoted by the same respective reference numerals. However, according to Fig. 29, a valve is connected in series with the breaker 503. Under the effect of the impulse current, the resultant current $I_r$ passes through zero ahead of the total current I (compare, for instance, the broken-line current wave $I_r'$ in Fig. 25). At the moment A (Fig. 25), the valve 521 (Fig. 29) commences to block the current flow, and the contact bridge 506 can now separate from the contacts 504 and 505 practically without current flow and at slight voltage.

The embodiment of Fig. 30 corresponds essentially to that of Fig. 29 except that the valve is replaced by a commutating reactor 522 comprising a saturable iron core 523, a main winding 524 and, if desired, a premagnetizing winding 525. At the moment when the resultant current $I_r$ approaches zero, the commutating reactor 522 is reversely magnetized and, during the interval of saturation reversal, prevents the flow of current through the breaker 503.

To permit giving the valve 521 in Fig. 29 or the commutating reactor 523 in Fig. 30 small dimensions, care must be taken to keep the voltage of these components as low as possible. This can be done by giving the capacitor 507 a relatively large capacitance value, for instance 1000 mfd., and charging it up to an only moderate voltage, for instance 50 volts, while, of course, a correspondingly small inductance 508, for instance 20 microhenrys, must be used to make the impulse current sufficiently large and to give the impulse frequency the desired value. As in the preceding embodiments, the impulse circuit in apparatus according to Figs. 29 and 30 need not necessarily be oscillatory, an impulse circuit composed, for instance, of a capacitance and a resistance being likewise applicable. Apparatus according to Figs. 29 and 30 are especially favorable for mechanically or electromagnetically controlled contact rectifiers.

Fig. 31 exemplifies an embodiment of the invention applied to a three-phase contact rectifier. A three-phase transformer 530 with a delta-connected primary winding 531 and star-connected secondary windings 532, 532', 532'' provides excitation for a load 533 to be supplied with rectified current. Only the phase circuit connected with the transformer winding 532 is described in the following, the other two phase circuits being identical except that the appertaining synchronous switches operate in a cyclical 120° phase relation to each other.

The phase circuit energized from winding 532 corresponds in principle to one of the above-described main circuits of the preceding embodiments. This circuit is equipped with a relatively small commutating reactor 534 having an iron core 535 with an air gap 536 and having a reactor winding 537 inductively linked with the core 535. During the major portion of a current half-wave, the inductive impedance of winding 537 is negligible. However, when the current in winding 537 approaches a zero passage, the core 535 becomes unsaturated so that the winding 537 temporarily assumes a high reactive impedance thus distorting the current wave and producing in that wave a weak-current or zero-current interval (step interval). A circuit point between the transformer winding 532 and the commutating reactor winding 537 is connected with two valves 538 and 539. A resistor 540 having a displaceable tap contact 541 is series connected with an air-core inductance coil 542. Coil 542 has terminal and tap points at $a$, $b$ and $c$. Connected between points $a$ and $c$ is a capacitor 543 (capacitance value $C_1$). A capacitor 544 (capacitance value $C_2$) is connected between the points $b$ and $c$. Also connected to points $a$ and $b$ is a portion of another air-core inductance coil 545 with terminal points $u$, $w$ and an intermediate tap point $v$. Connected to the terminal point $w$ of coil 545 is the anode 547 of a triode 546 whose cathode and grid are denoted by 548 and 549 respectively. A quick-acting electromagnetic switch 550 has its stationary contacts 551, 552 and its contact bridge 558 series connected in the main circuit. Contact bridge 553 is suspended by means of a spring 554 tending to normally hold the contact bridge away from the stationary contacts. The contact bridge is electromagnetically controlled by a switch-on or make coil 555 series connected in the main circuit. When energized, the make coil 555 causes the contact bridge 553 to move into closing engagement with the stationary contacts 551 and 552. The synchronous switch 550 is further provided with an auxiliary make coil 556 and a break coil 557. The switch gap is bridged by a valve 558. The break coil 557 is series connected with a resistor 559 and with the above-mentioned valve 539. A voltage transformer 560 has its primary winding connected between the tap contact 541 of resistor 540 and a tap point of the inductance coil 542. The secondary winding 562 of transformer 560 is connected to a direct-current source of constant voltage, represented by a battery 563, in series with a high-value resistor 564 between the cathode 548 and the grid 549 of triode 546.

The operation of the rectifying apparatus according to Fig. 31 is as follows: At the moment when the voltage of the power transformer winding 532 becomes positive relative to the point 0 of the load circuit, a current commences to flow through the load 533 from winding 532 through valve 538 through the auxiliary make coil 556 and through point 0 of the load circuit. Coil 556 attracts the contact bridge 553 and contacts 551 and 552 are conductively connected with each other. Prior to this moment, a small current was flowing from the transformer winding 532 through reactor winding 537, resistor 540, inductance 542, and through the main make coil 555 and the valve 558 to point 0. However, since the commutating reactor 534 is then reversing its polarity of saturation, the latter current is only slight. Beginning with the moment when the synchronous switch 550 is closed, the full commutating voltage is effective across the winding 537 of the commutating reactor 534 so that the reactor becomes rapidly saturated in the reverse direction. Thereafter the current through reactor winding 537 increases and the contact pressure in switch 550, because of the increased excitation of its main make coil 555, also increases. Due to the blocking effect of the valve 539, the break coil 557 is still deenergized.

When now the main current passes beyond its maximum value and declines toward the next zero passage, the grid 549 of triode 546 becomes positive at a definite time point prior to the zero passage, so that triode 546 is ignited in the same manner as explained above with reference to Fig. 28. Now the capacitor 543 discharges through the entire inductance 545, the tube 546, the contact bridge 553 and the main make coil 555, while the capacitor 554 discharges through the portion $v$—$w$ of inductance 545, the tube 546, the contact bridge 558 and the coil 552. The discharge currents of both capacitors 543, 544 produce together a weak-current step in the wave of the current flowing through the synchronous switch 550. If the capacitance values $C_1$, $C_2$ of capacitors 543, 544, as well as the corresponding inductivity values and voltages across the portions $a$—$c$ and $b$—$c$ of inductance coil 542, are properly selected, then the two oscillations in the circuits of the respective capacitors 543, 544 superimpose themselves upon each other in such a manner that the step current (i. e. the current flowing through switch 550 during the above-mentioned weak-current interval) is very small. If a still better adaptation is desired, further capacitors may be connected to properly selected partial voltages of the inductance coil 542, or a circuit connection according to Figs. 29 and 30 may be used. It will readily be seen that the step current can be made as small as desired without any appreciable additional expenditure.

At the moment when the main current in the make coil 555 of switch 550 becomes reduced to the small value of the step current, the attractive action of this coil virtually ceases, and the contact bridge 553 moves to the open position, at first only under the biasing force of the spring 554. Shortly thereafter, the commutating reactor 535 becomes saturated in the reverse direction so that now a voltage is impressed upon the break coil 557, this voltage being subsequently identical with the blocking voltage. Due to the excitation of coil 557, the contact bridge 553 is increasingly forced away from the stationary contacts 551, 552 in accordance with the increasing blocking voltage. At the moment when the main current passes through zero, the valve 558 becomes non-conductive, thus completing the interruption of the phase circuit of transformer winding 532.

A salient advantage of the described rectifying apparatus lies in the fact that its performance is completely independent of the driving voltage as well as of the nature and magnitude of the load. More particularly, the control or premagnetization require no voltages which are in any way derived from the neighboring phases (532' and 532"). This is fundamentally different from the inter-phase circuit connections required for premagnetized commutating reactors as heretofore used in contact converters. While with such inter-phase connections the occurrence of non-symmetrical voltages or other asymmetries may impair the proper premagnetization and thus endanger the operation of the converters, such impairments are completely obviated in a converter system according to the present invention.

Another salient advantage of the described converting system lies in the fact that the required capacitors and air-core inductance coils involve only a fraction of the cost of a commutating reactor rated for the full voltage as needed in the known contact converter systems.

It will be evident from the foregoing to those skilled in the art that the invention permits of various modifications and may be embodied in apparatus other than those specifically illustrated and described, without departing from the essential features of the invention and within the scope of the claims annexed hereto.

I claim:

1. Circuit breaker apparatus, comprising a load circuit to be opened, a normally closed main switch in said load circuit providing a current-interrupting gap when open, a normally open impulse circuit connected across said gap and having circuit closing means, control means connected with said closing means for closing said impulse circuit at a time near the opening of said main switch, said impulse circuit having impulse generating means operative upon closing of said circuit closing means to pass through said gap an instantaneous current pulse of opposite polarity relative to the load current, said impulse generating means comprising a normally charged capacitance and voltage supply means connected with said capacitance for charging said capacitance, said voltage supply means having at said capacitance a voltage higher than the minimum required for the instantaneous amplitude of said current pulse to be higher than the simultaneously instantaneous magnitude of said load current.

2. Circuit breaker apparatus, comprising a load circuit to be opened, a normally closed main switch in said load circuit providing a current-interrupting gap when open, a normally open impulse circuit connected across said gap and having circuit closing means, control means connected with said closing means for closing said impulse circuit at a time near the opening of said main switch, said impulse circuit having impulse generating means operative upon closing of said circuit closing means to pass through said gap an instantaneous current pulse of opposite polarity relative to the load current, said impulse generating means comprising a normally charged capacitance and an inductance interconnected to form together an oscillator, and voltage supply means connected with said capacitance for charging said capacitance and having at said capacitance a voltage higher than the minimum required for the instantaneous amplitude of said current pulse to be higher than the instantaneous magnitude of said load current.

3. Circuit breaker apparatus, comprising a load circuit to be opened, a normally closed main switch in said load circuit providing a current-interrupting gap when open, a normally open impulse circuit connected across said gap and having circuit closing means, switch control means connected with said main switch and said circuit closing means for controlling said closing means to close said impulse circuit shortly prior to the opening of said main switch, said impulse circuit having impulse generating means operative upon closing of said circuit closing means to pass through said gap an instantaneous current pulse of opposite polarity relative to the load current, said impulse generating means comprising a normally charged capacitance and voltage supply means connected with said capacitance for charging said capacitance, said voltage supply means having at said capacitance a voltage higher than the minimum required for the instantaneous amplitude of said current pulse to be higher than the instantaneous magnitude of said load current.

4. In circuit breaker apparatus according to claim 1, said voltage supply means being connected with said load circuit to be energized in dependence upon said load current, whereby said capacitance is charged to a voltage value substantially proportional to the instantaneous value of said load current.

5. Circuit breaker apparatus, comprising a load circuit to be opened, a normally closed main switch in said load circuit providing a current-interrupting gap when open, a normally open impulse circuit connected across said gap and having an auxiliary switch, control means connected with said two switches for causing said auxiliary switch to close said impulse circuit at a moment near the opening of said main switch, said impulse circuit having impulse generating means operative upon closing of said auxiliary switch to pass through said gap an instantaneous current pulse of opposite polarity relative to the load current, said impulse generating means comprising a normally charged capacitance and voltage supply means connected with said capacitance for charging said capacitance, said voltage supply means having at said capacitance a voltage higher than the minimum required for the instantaneous amplitude of said current pulse to be higher than the instantaneous magnitude of said load current.

6. In circuit breaker apparatus according to claim 1, said circuit closing means comprising a spark gap in said impulse circuit, and circuit means connecting said spark gap with said load circuit for igniting said spark gap to close said impulse circuit in dependence upon said load current.

7. Circuit breaker apparatus according to claim 2, comprising a reactor having a core and two windings inductively linked with said core, one of said windings forming said inductance of said oscillator, and said other winding being connected in series with said load circuit, whereby the capacitance-inductance product of said oscillator is kept at a substantially constant value.

8. In circuit breaker apparatus according to claim 1, said impulse circuit comprising voltage limiting resistance means connected between said capacitor and said voltage supply means to limit the voltage impressed on said capacitance, said resistance means being operative to remain substantially constant in value during the flow of impulse current and increase in value during subsequent flow of equalizing current.

9. In circuit breaker apparatus according to claim 1, said impulse circuit comprising an oscillatory circuit of which said capacitance forms part, and impedance control means connecting said oscillatory circuit with said load circuit for varying the impedance of said oscillatory circuit in dependence upon said load current.

10. In circuit breaker apparatus according to claim 1, said impulse circuit comprising a plurality of mutually parallel branches, each branch having a capacitance and an inductance connected in series with each other to jointly form an oscillatory circuit, and circuit means connecting said respective oscillatory circuits with said load circuit, said oscillatory circuits being responsive to respectively different instantaneous values of said load current.

11. In circuit breaker apparatus according to claim 1, said impulse circuit comprising a plurality of mutually parallel branches, each branch having a capacitance and an inductance connected in series with each other to jointly form an oscillatory circuit, and said control means comprising a plurality of spark gaps series-connected in said respective oscillatory circuits, and circuit means connecting said respective spark gaps with said load circuit for selectively igniting said spark gaps under control by said load current.

12. In circuit breaker apparatus according to claim 1, said control means comprising a pair of spark gaps, current-responsive circuit means connecting one of said spark gaps with said load circuit for impressing upon said one spark gap an igniting voltage substantially proportional to the instantaneous value of said load current, circuit means responsive to the rate of change of said load current and connecting said other spark gap with said load circuit for impressing upon said other spark gap an igniting voltage substantially proportional to said rate of change, said spark gaps being connected with said impulse circuit to cause closing thereof when ignited.

13. In circuit breaker apparatus according to claim 1, said control means comprising adjustable timing means connected with said main switch and said circuit closing means, said control means being connected with said load circuit and responsive to said load current to close said impulse circuit and momentarily thereafter open said main switch upon said load current reaching a predetermined absolute value.

14. In circuit breaker apparatus according to claim 1, said circuit closing means comprising two spark gap devices selectively connecting, when individually ignited, said capacitance with a different polarity of connections across said gap; and said control means comprising two sensing devices connected with said load circuit and adjustably responsive to given magnitudes of the positive and negative half-waves respectively of said load current, said sensing devices being connected with said respective spark gaps for selectively igniting them when said load current in either half wave reaches said magnitude, whereby said current pulse changes its polarity upon response of a given one of said sensing devices.

15. In circuit breaker apparatus according to claim 1, said circuit closing means comprising two spark gap devices selectively connecting, when individually ignited, said capacitance with a different polarity of connections across said gap; and said control means comprising two sensing devices each having a saturable inductor inductively linked with said load circuit and pre-magnetized in a sense of polarity opposed to that of the other inductor whereby said two sensing devices are responsive to given magnitudes of the positive and negative half-waves respectively of said load current, said inductors having respective windings connected with said two spark gaps for selectively igniting them when said load current in either half wave reaches said magnitude, whereby said current pulse changes its polarity upon response of a given one of said sensing devices.

16. In circuit breaker apparatus according to claim 1, said main switch having a control winding for opening said main switch, said control winding being connected with said control means to be energized in dependence upon operation of said circuit opening means, whereby said winding causes said main switch to immediately open upon closing of said impulse circuit.

References Cited in the file of this patent
UNITED STATES PATENTS

| | | |
|---|---|---|
| 1,681,196 | Rudenberg et al. | Aug. 21, 1928 |
| 1,873,048 | Schmidt | Aug. 23, 1932 |
| 2,094,361 | Lee | Sept. 28, 1937 |
| 2,207,969 | Burton | July 16, 1940 |
| 2,246,064 | Rea | June 17, 1941 |
| 2,470,825 | Mathes | May 24, 1949 |